Sept. 15, 1936.                  D. SCIAKY                      2,054,343
                        ELECTRIC SPOT WELDING APPARATUS
                      Filed Aug. 6, 1934          6 Sheets-Sheet 1
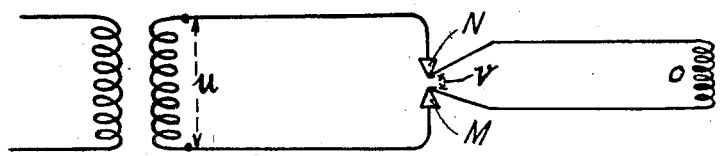
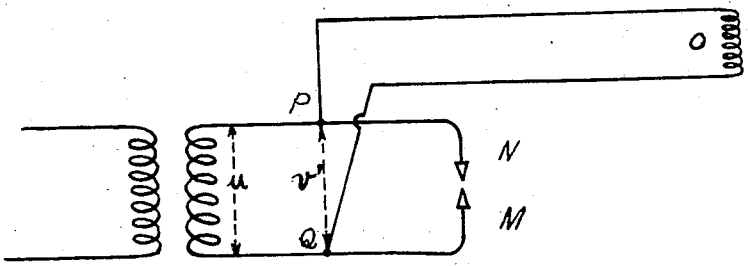
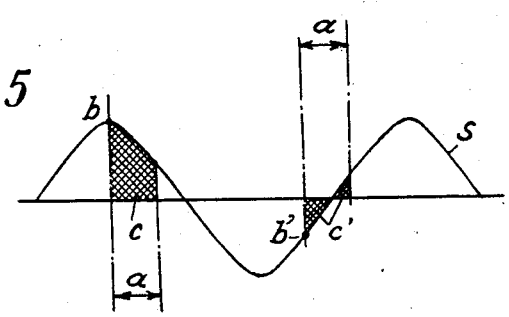
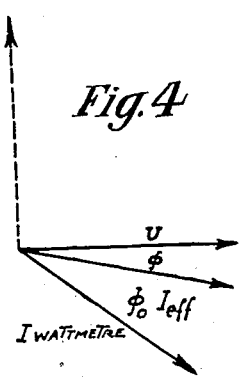
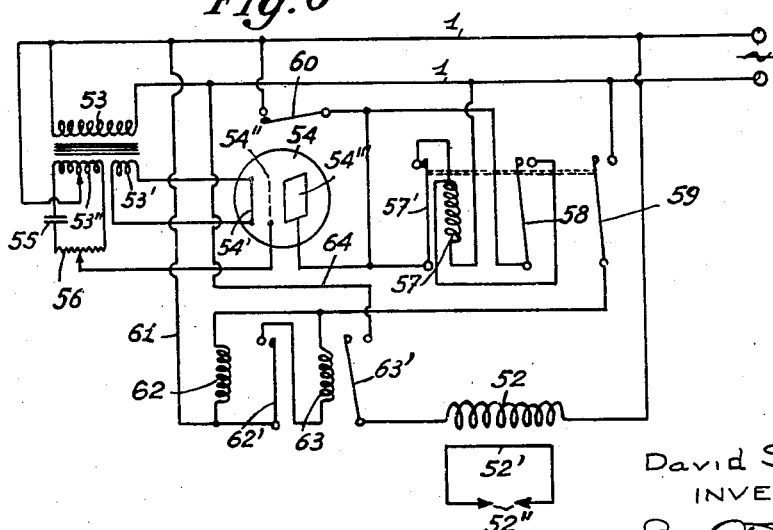
David Sciaky
INVENTOR

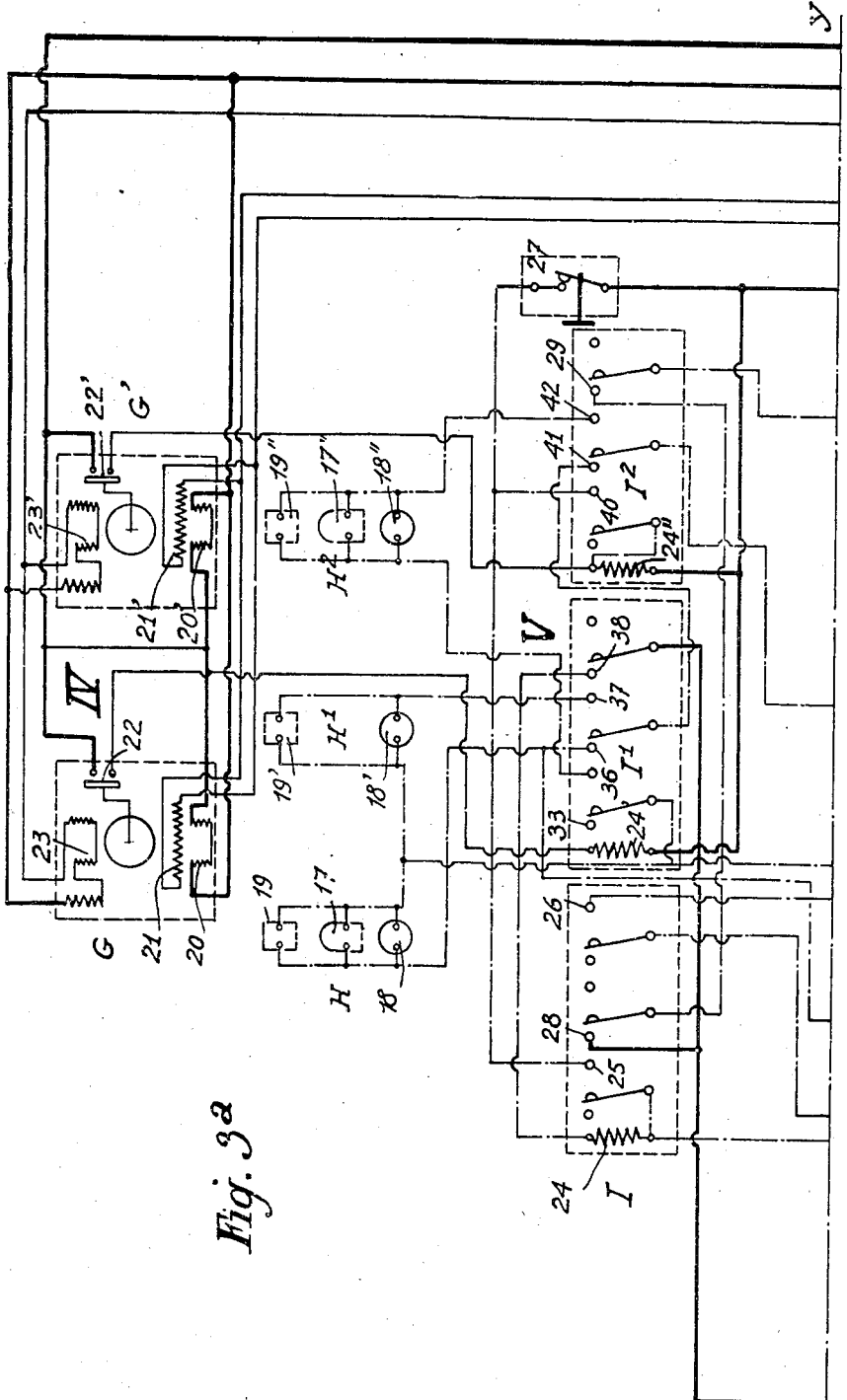

Sept. 15, 1936.  D. SCIAKY  2,054,343
ELECTRIC SPOT WELDING APPARATUS
Filed Aug. 6, 1934    6 Sheets-Sheet 4
Fig. 7
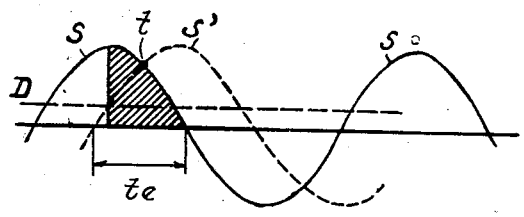
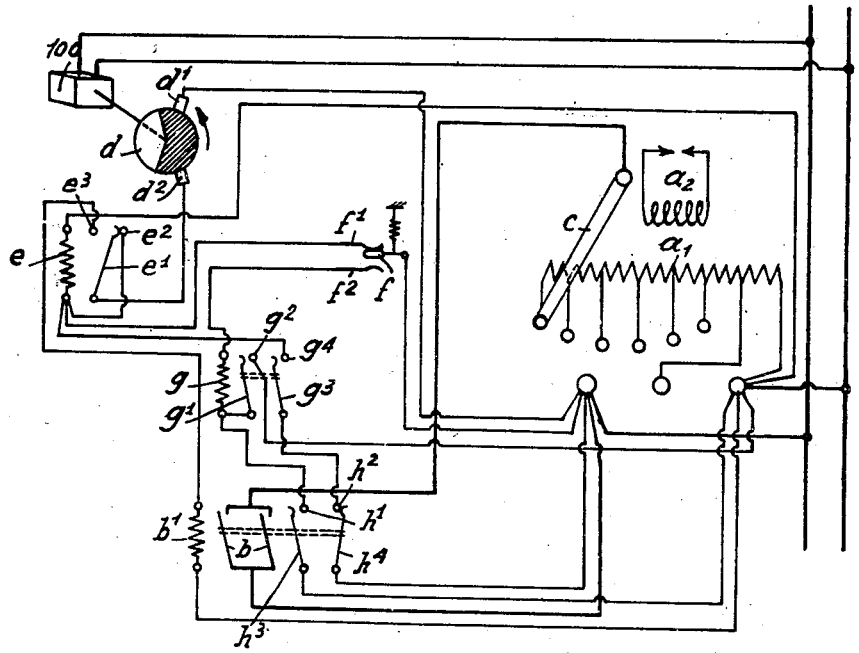
Fig. 8
David Sciaky
INVENTOR
his ATTY.

Sept. 15, 1936.    D. SCIAKY    2,054,343
ELECTRIC SPOT WELDING APPARATUS
Filed Aug. 6, 1934    6 Sheets-Sheet 5
Fig. 9
Fig. 10
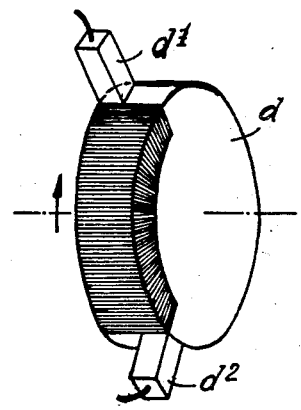
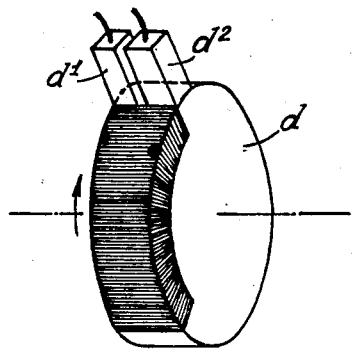
Fig. 11
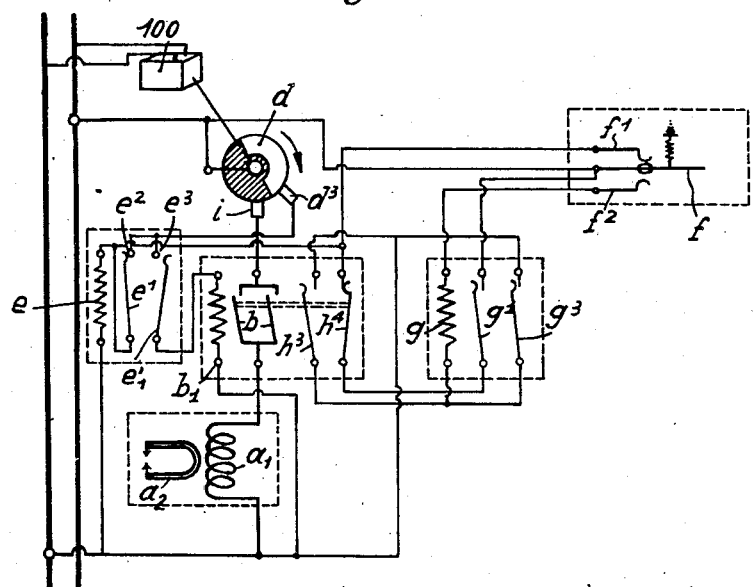
David Sciaky
INVENTOR
his ATTY.

Sept. 15, 1936.         D. SCIAKY         2,054,343
ELECTRIC SPOT WELDING APPARATUS
Filed Aug. 6, 1934         6 Sheets-Sheet 6
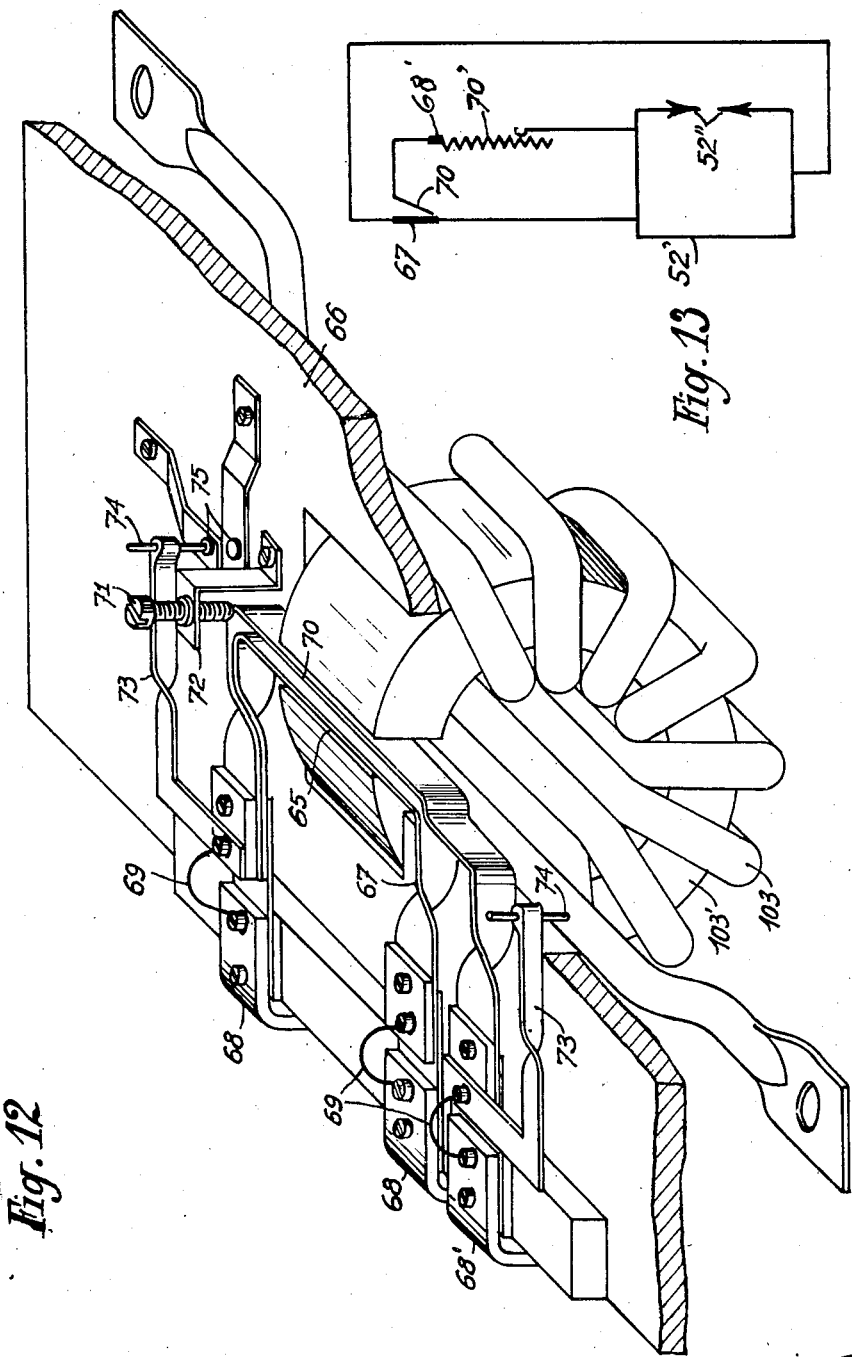
David Sciaky
INVENTOR
By [signature]
his ATTY.

Patented Sept. 15, 1936

2,054,343

UNITED STATES PATENT OFFICE 2,054,343

ELECTRIC SPOT WELDING APPARATUS

David Sciaky, Paris, France

Application August 6, 1934, Serial No. 738,647
In France August 16, 1933

3 Claims. (Cl. 219—4)

This invention relates to improvements in methods and devices for electric spot welding.

It has already been proposed to control, by multiple means, the conditions under which electric spot welding operations are executed and the corresponding operation of the machine. Thermic or magnetic ammeters are generally used for this purpose, which measure either $$\int_{t_1}^{t_2} i\, dt$$

$$\int_{t_1}^{t_2} i^2\, dt$$

or even $$\int_{t_1}^{t_2} ui\, dt$$

$t_1$ being the starting time of the welding, $t_2$ the stopping time, $i$ the intensity of the welding current and $u$ the voltage at the terminals of the source of energy during all the time.

If only $$\int i\, dt$$

or $$\int i^2\, dt$$

is measured, the power dissipated in the welding operation is a function of the intensity of the current, because, the potential difference in the feeding circuit remaining constant, only the resistance of the welding can modify the intensity of the current.

In either case this measure is not exact, because the length and the form of the arms of the welding clamps as well as the presence of pieces of magnetic metal in the arms of the welding machine considerably modify the power acting for a given intensity.

It is more important to measure the energy which is developed in the welding operation by means of the voltage at the points of application of the electrodes on the metal sheets which are to be welded.

The method consists in measuring $$\int_{t_1}^{t_2} vu\, dt,$$

$v$ being no longer the feeding potential difference $u$, but the voltage at the points of application of the electrodes on the metal sheets to be welded.

It is known that, if the distribution which serves for feeding is alternating and sinusoidal, the above integral gives $$\left[VI\cos\varphi\right]_{t_1}^{t_2}.$$

This necessitates the use of the angle $\varphi$ corresponding to the phase shifting between the voltage and the intensity.

This method is clearly indicated in Figure 1 of the appended drawings, which shows the welding electrodes M and N, between which the voltage $v$ is measured.

In practice it is very difficult to connect the measuring winding exactly to the points of the electrodes and the above mentioned method does not on first flush appear to be commercially practicable.

The present invention consists in a method according to which the voltage $v$ is replaced by a voltage $v'$ taken between two points P and Q which are readily accessible (Figure 2), the wattmeter being arranged for measuring, not $VI\cos\varphi$, but a function $V'I\cos(\varphi+\varphi_0)$, said angle $\varphi_0$ corresponding to the error which has been introduced by the inactive arms of the clamps, thus permitting to substitute for the value of the voltage V the value of the voltage V', which can be easily measured.

The method is, therefore, characterized by the fact that the voltage is measured at points which are conveniently spaced from the electrodes and that the various errors are corrected by determining a convenient shifting of phases between the two electric circuits which affect the measuring operation.

The invention has to do with the above described methods irrespective of the particular measuring devices used.

More particularly the invention relates to an electric spot welding installation comprising a wattmeter, having two windings, one of which is traversed by the welding current, while to the other a voltage is applied, the phase of which is initially displaced with respect to the welding current, thus making the wattmeter easily adapted to measure whichever may be the complicated functions and the values of the variables which enter into said functions.

Assuming that the pressure at the electrodes is very high, the heat developed at the welding point remains low because, at great intensity, the phase shift $\varphi$ is also great. As the initial phase shift $\varphi_0$ of the current feeding the wattmeter is selected so that $\varphi+\varphi_0$ is, under these conditions, nearby 90°, the indication of the wattmeter remains conveniently low.

If the pressure at the electrodes diminishes, the phase shifting decreases and while the intensity of the current is lower, more heat is conveyed to the weld. In this case $\phi+\phi_0$ having a value which differs more than 90°, the indication of the wattmeter is also greater.

The method of control according to the invention also takes into account the effect which is produced by the presence of magnetic pieces of metal in the neighbourhood of the conductors which supply the current. $\phi$ being then increased, it is necessary that the useful intensity be greater in order to deliver the same impulse to the wattmeter.

Finally, if the resistance at the welding point is too high, either because an insulating material is inserted or because the pieces are not in contact with another, the intensity of the current will be much weaker. The indication of the wattmeter will be materially reduced, and this will represent actual conditions since the welding will be too weak in this case.

The indications of the wattmeter may be substantially varied by varying the value of the initial phase shift $\phi_0$. This control may be effected with great precision.

Another form of execution of the invention is characterized by two wattmeters of different sensitivity and the actions of which are combined in order to permit the classification of the weldings by their deviation from normal.

In spot welding machines the quantity of energy developed at each welding is kept as constant as possible. When the machine is supplied with alternating current it is not enough precisely to determine the duration of closing of the switch, because depending on the moment of closing and opening the switch for the passage of the current with respect to the maximum value of the voltage of the alternating current (in other words, depending on the "phase" of closing and opening) the effective values of the current may be exceedingly different and consequently, the welding results will be very different.

It has been proposed to associate with the starting switch of the machine a synchronous distributor which automatically insures the closing and opening of the circuit when the sinusoidal curve attains a certain value (i. e. at a precise moment of the cycle), and which insures the closing of the contact (control pedal). For this purpose, a sector actuated, for instance, by the synchronous motor and combined with a fixed brush is usually arranged in series with the ordinary switch. The duration of the closing of the circuit is limited to the time during which the conducting sector lies under the brush. Generally this arrangement gives good results if the duration of the closing of the circuit is very short and definitely shorter than a half-cycle. If the duration of closing of the circuit is very short, the contact of the pedal is unlikely to close when the sector lies under the brush, and the welding time is determined by the time during which the sector passes under the brush. It may happen, however, that the pedal is closed at a moment when the contact of the distributor is established, in which case the duration is reduced and the welding will be very weak. Furthermore, it is obviously impossible to go beyond this value, that is to say to cause the current to flow during a considerable time, for instance during a plurality of consecutive half-cycles, since otherwise the system of "getting in phase" would be rendered completely illusory.

Prior investigators have assumed, therefore, that it was impossible to reconcile the problem of the "multiplicity" of the half-cycles, that is to say to insure any value for the duration of the welding operation, with the well known problem of the "getting in phase", that is to say of insuring the closing and the opening of the circuit at a predetermined point of the sinusoidal curve. It has been further assumed, that the probability of the time of the welding operation being reduced was the greater, the longer the closing of the circuit lasted, and that this could not be avoided.

The present invention contemplates the provision of an electro-mechanical cam and relay device which makes possible the adjustment of the duration and, generally, the "getting in phase" and insures perfect operation of the welding machine irrespective of working conditions.

The electric welding machine comprises for this purpose a shaft with three cams driven by a synchronous motor, each of said cams closing during every revolution a contact in the relay circuits. The first relay becomes energized under the control of the first cam when the pedal is depressed and prepares the welding circuit, whereupon the closing of the contact by the second cam energizes a second relay which prepares the welding circuit, the latter being closed when the second cam establishes its contact. The closing of the contact by the third cam brings the whole device to a rest.

By the above described device it is possible to close the contact of the pedal at any time. The first cam which prepares the circuit, causes a delay which is necessary for the shifting of the welding operation at the predetermined point on the sinusoidal curve.

The three cams coact in the following manner: the first cam prepares the circuit, the second cam closes it and maintains it closed during a plurality of consecutive half-cycles, whereby greater energy may be developed in the welding operation. The third cam brings the whole device to rest and thus prevents the execution of a plurality of consecutive passages of current through the same point to be welded should the pedal be maintained depressed.

It has been previously been proposed to supply the anode of a rarefied gas tube containing a control grid with an alternating current and to use the phase shifting of the alternating voltage feeding the grid in order to cause the current of the anode to pass at a given point of the sinusoidal curve.

The present invention relates to a novel application of this known method to electric spot welding machines. Thus it is possible to replace the synchronous motors and to produce one of the essential conditions for good welding with alternating current, i. e. always to close the welding circuit at a determined point of the sinusoidal curve.

The welding machine is equipped with an electronic valve having a biased grid to which applied an alternating current voltage which is out of phase with respect to the feeding current of the welding machine.

The welding circuit may thus be closed by means of simple static devices which are easy to adjust, for instance by means of a contactor which is fed by the valve.

These and other features of the invention will be hereinafter disclosed in greater detail and defined in the claims.

Welding machines according to the invention are shown by way of examples in the appended drawings, in which Figs. 1 and 2 show well known circuit arrangements.

Figures 3a and 3b, which should be joined at the line x—y, show the diagram of a welding machine unit according to the present invention.

Figure 4 is an explanatory diagram representing the initial phase shifting of the wattmetric current.

Figure 5 is a diagram representing the moment of closing of the welding circuit for switching on the current.

Figure 6 is the diagram of the control device for closing the welding circuit by means of a triode.

Figure 7 is a diagram showing the operation of said device.

Figure 8 is the diagram of a third embodiment of the invention.

Figures 9 and 10 are perspective views showing a detail of construction of said third embodiment.

Figure 11 is the diagram of another embodiment.

Figure 12 is a perspective view of a ballistic wattmeter which may be used in the plant according to the invention.

Figure 13 is a diagram of the arrangement of the circuits for the moving coil unit of said wattmeter.

Figure 3B:
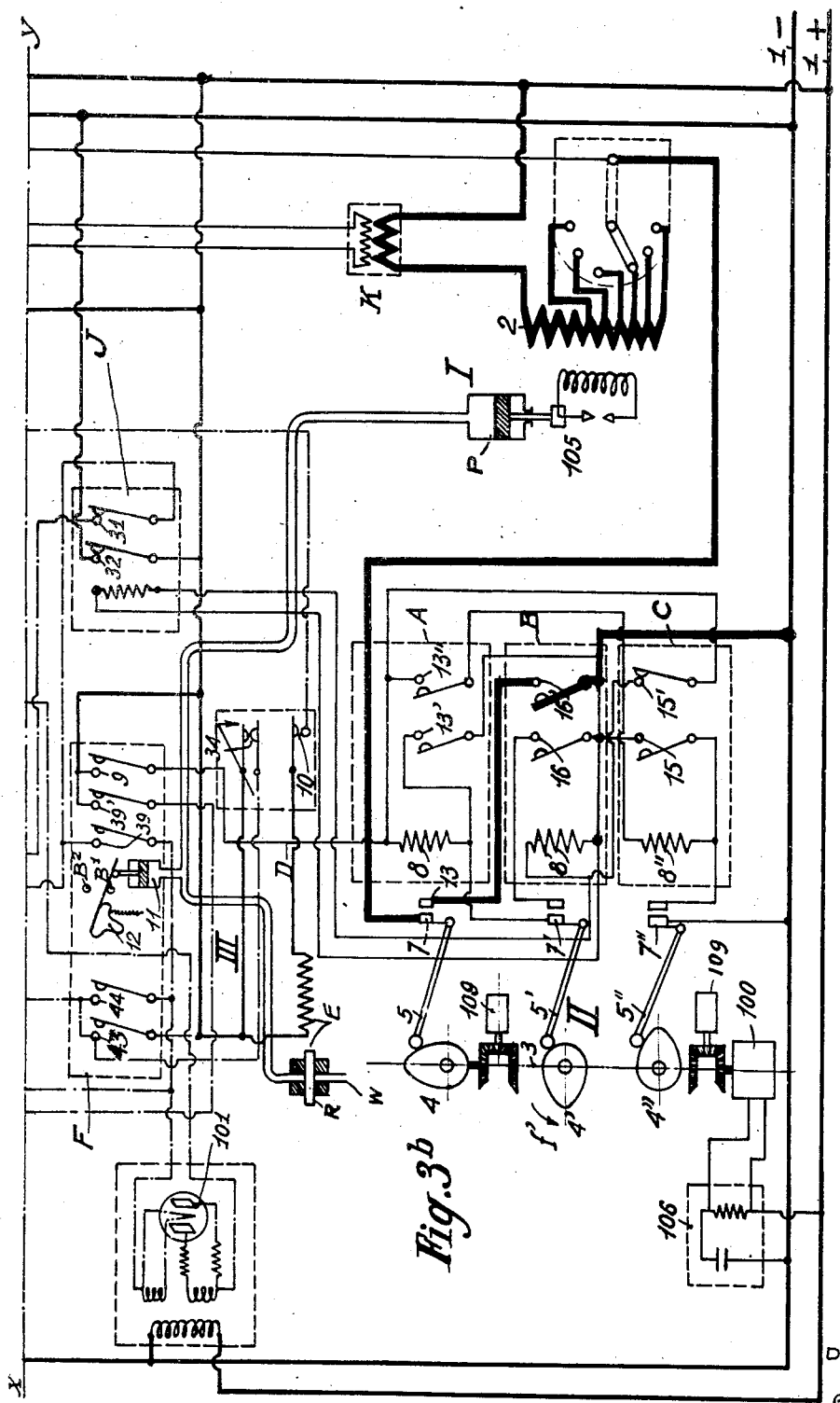

In the whole unit shown in Figures 3a and 3b:

(a) Group I shows the transformer and the welding machine.

(b) Group II shows the synchronous motor, the cams actuated by said motor and the relays combined with said cams.

(c) Group III shows the devices for insuring the pressure of the electrodes on the sheets to be welded and the corresponding electrical switches.

(d) Group IV is a group of two wattmeters which control the quantities of energy developed in the welding operations.

(e) Group V shows the signaling system controlled by the wattmeters and the automatic locking devices controlled by said signaling systems.

*I—Operation of the synchronous motor (Group II) in the welding plant (Group I)*

The sinusoidal curve S in Figure 5 shows, in the classical manner in function of time, the variations of the alternating welding current. If a is the constant welding time, the quantity of electricity which passes through the welding point is dependent on the closing point of the circuit. This point may be at b or b', depending on which the quantities of electricity differ from another in the same way as the hatched surfaces c and c'. Thus the welding circuit should always be closed at the same point of a half-cycle, if it is desired that each welding point receive the same quantity of electricity, whereby a constant quantity of energy will be supplied to the welding points, insuring thus the optimum conditions for welding.

In Figures 3a, 3b a shunt derived from the line I supplies the primary winding having a plurality of taps 2 of the transformer of the machine (Group I). The closing of this shunt is under the control of the device shown to the left of the transformer. Said device comprises a cam shaft 3 constantly revolving in the direction of the arrow f' under the control of a synchronous motor 100 having a suitable demultiplicating gear ratio (Group II), thus reducing the speed of the cam shaft with a motor running at high speed and to extend the welding time over a plurality of half-cycles and, therefore, to convey more energy for the welding. The synchronous motor is fed from the same source of alternating current energy as the welding transformer, so that the adjustment of the synchronous motor with respect to the voltage maximum of the alternating current feeding circuit remains constant. The synchronous motor 100 is associated with means 106 permitting the adjustment of the phase shifting of said motor with respect to the cams; the said adjusting means may be either electrical or mechanical. For instance, it is possible electrically to operate by shifting the alternating voltage which supplies current to the motor 100 with respect to the voltage of the supply main by known means 106 such as self induction coils, resistances, condensers and the like, the said means being used alone or in combination.

The various elements constituting Group II which permit always to take the current at the same point of the sinusoidal curve operates in the following manner:

On the cam shaft 3 are keyed three cams 4, 4', 4" angularly displaced with respect to one another. The cam 4' prepares the relay circuits. The cam 4 then causes the welding to be effected. The cam 4" returns all the circuits into their initial position.

Each of the cams 4, 4', 4" works on a lever 5, 5', 5" one arm of which closes a contact 7, 7', 7" at each passage of the cam rise.

To each contact 7, 7', 7" corresponds a relay A, B, C respectively. The three relays A, B, C serve for the following purposes: The relay B prepares the welding circuit for its automatic closure, whereby the operation of the same is made independent of the closing time of the contact 7'.

The relays A and C are also self-locking relays; they make the closure of the circuit independent of the durations of closure of the contacts 7 and 7", so that only the moment of the closure of the contacts 7, 7' and 7" plays a part in the operation of the machine during the cycle.

The above described general features may be obtained in the following manner:

The closure of the circuit of the coil 8 of A is dependent on the contact 7' of B and on a contact 9 (Group III). It is not enough that the point of the sinusoidal curve at which the current is taken be suitably selected in the known manner; provision must be made also for automatically predetermining that the sheets to be welded have been pressed together at a suitable pressure. This is controlled by the piston 11 which in turn is controlled by electromagnetic-valve E of Group III, which permits the setting in operation of the machine, that is to say the closure of the corresponding relays only when the electrodes have been moved against one another at the required pressure.

When the pedal D of the machine is depressed the current is conveyed to the coil of the electromagnet E, which opens the cock valve R fed through the line W; thus the pressure is established between the electrodes through the cylinder P; the electromagnetic-valve F, which forms a true pressure-gauge, measures the pressure at the electrodes at every moment and is released when a predetermined pressure is reached and closes the contact 9. The circuit of the electromagnetic-valve E being then closed, due to the closing of the contact 10, the valve admits a fluid under pressure into a cylinder 11 which then tilts the member 12. The function of this is to actuate the contacts grouped at F. When energized, the coil 8 closes not only a contact 13 in the circuit of the primary winding of the transformer 2, but also two other contacts 13' and 13''. The contact 13' closes a line connecting a terminal of 8 with the circuit of the primary of the transformer at a terminal of the relay B. The contact 13'' cooperates with the contact 7'' and the contact 9 to control the energizing circuit of the coil 8'' of the relay C. When energized, said coil closes the contact 15 and opens the contact 15'. The first contact is in the line connecting a terminal of the coil 8'' with a terminal of the relay B. The second contact is in a line connecting a terminal of the coil 8' of relay B to the contact 9. When energized, coil 8' closes both contacts 16 and 16'. The first contact is in series with the circuit of the coil 8 of A and with the contact 7' of B. The second contact is in the circuit of the primary winding of the transformer.

In order that the unit permit a single welding only for each depression of the pedal, while the synchronous motor runs continuously, the cam 12 is so arranged that it is actuated in one direction only upon the displacement of the piston 11; it is thus necessary that the pressure fall again to its initial value before the circuits may be closed again and a new welding operation may be effected. The relays A, B, C, which have self-locking contacts, can operate once only for each depression of the pedal D.

The operation of the above described device is as follows.

(a) *Preparation of the circuits*

The machine being at rest, the electromagnetic-valve and the various contacts of the same are in the position shown in the drawing. When actuated in the above explained manner, the contact 9 closes the circuit of the coil 8', so that the contacts 16 and 16' close and remain closed. If, at this moment, the cam 4 (releasing cam) closes its contact 7, this produces no effect no matter when the closure takes place and what its duration may be.

However, as soon as the cam 4' (preparing cam) has established the contact 7', the coil 8 is energized and closes the contacts 13, 13', 13''. Coil 8 remains energized owing to the closure of 13' and maintains its contacts closed preparing the circuits for the welding operation.

(b) *Welding operation*

When the cam 4 (releasing cam) closes the contact 7, the welding circuit is closed through 13 and 16' at a predetermined moment of the half-cycle. It receives current so long as 7 remains closed, then it is interrupted through the cam 4'' reestablishing the initial condition. Consequently, the relative position of the cams 4 and 4'' determines the time during which the current passes through the welding machine. Mechanical means 100 is provided to adjust the relative position of the cams 4, 4' and 4'' and, consequently, duration of the current flow through the welding machine.

(c) *Reestablishing the initial condition*

The cam 4'' closes the contact 7'' and the relay C opens the contact 15' and maintains it opened, whereupon the energizing circuit of 8' is interrupted and the relay B becomes deenergized. Relay B interrupts the energizing circuit of 8 at 16, and relay A also becomes deenergized. Relay A opens in contact 13'' the energizing circuit of C which becomes deenergized.

II—*Control devices*

The machine comprises:
(a) a control device (Group IV) receiving electric current from the machine;
(b) a coupling and locking signalling device (group V) which is controlled by the control device.

(a) The start of the welding current, that is to say the exact point on the sinusoidal curve where the current is taken for the welding operation, can be adjusted by moving the stator of the synchronous motor 100 about the axis of the rotor.

(b) The control device for controlling the quality of the welding comprises two wattmetric meters G—G1 and three groups of signaling meters H—H1—H2 representing weak weldings (H), normal weldings (H1), and burnt weldings (H2), respectively. Both groups H and H2 comprise an acoustical signaling means 17—17'', a lamp 18—18'' of a different colour for each of said signaling means, and a numerical meter 19—19''. The group H1 has only a single white lamp 18' and a numerical meter 19'.

The wattmetric meters each comprise a voltage coil 20—20' and an intensity coil or current coil 21—21' which is supplied with current by the current transformer K. The coils operate a disc which closes contact 22—22' when rotated at a predetermined angle. The disc is then returned to normal by another coil 23—23'.

The group H is represented by a relay I which, when its coil 24 is energized, closes both contacts 25 and 26 in circuits which are controlled by contacts closed by the member 12 when the pedal D is depressed. The closing of contact 26 holds the coil 24 energized by a circuit which can be interrupted only when a sealed button 27 is actuated. The energization of the relay I opens the contact 28 in a circuit controlled by the contact 29, the latter being opened by the relay I³, and a contact 10, which closes when the pedal is depressed.

In the inactive position, i. e. when the coils 24 are not energized, the switches are tilted to the left in the drawings.

*Case of a welding receiving insufficient energy*

If the welding does not receive the desired quantity of energy, none of the contacts of the wattmetric meters is closed when the welding operation is completed. A relay J which is provided with a closing dash pot and the coil of which is arranged in parallel with 8' is released at the beginning of the welding operation. At the end of said welding operation said relay closes two contacts 31—32 constituting safety switches, whereby the current in line 1 flows through the coil of relay I, which remains attracted until 27 is actuated, and which directs a current from the rectifier K1 fed by the transformer to flow in the signaling meter group H. The meter will indicate a weak welding. The lamp 18 is lighted and the acoustical signaling means sounds until the button 27 is operated. While the button 27 is not actuated it is impossible to use the machine, because the contact 28 remains open and the closure of the pedal contact 10 can no longer cause the current to flow through the valve E.

Case of normal welding

If the quantity of energy used in a welding operation corresponds to normal welding, the first wattmetric meter G closes its contact 22 whereupon the energizing circuit of the coil 24' of the relay I¹ is closed. This relay then closes a contact 33 on a line which is open at 34 while the pedal is depressed. It moves a moving contact of the contact piece 36 onto the contact piece 37 and opens the contact 38 which served for supplying the coil I with current.

The transfer of the moving contact from 36 to 37 causes current to flow through the second meter and signaling group H1, and the opening of contact 38 cuts the coil 24 of the relay I out of the circuit. The circuit of coil 24' of H1 is closed by 37, the delayed contact 31 and the contact 39 closed by the member 12. The numerical meter shows a good welding and the white lamp remains lighted until the operator releases the pedal.

Case of a welding receiving too much energy

When the welding receives too much energy, both wattmetric meters G—G1 close their contacts 22—22' successively. The closure of the first contact actuates the relay I¹ as previously stated and before the contact 31 is closed the relay I² is actuated. It closes the contact 40 through which it is held energized after the opening of 22', shifts a moving contact from 41 to 42 and opens the contact 29.

The metering and signaling group H2 receives, therefore, current from the rectifier 101. The numerical meter 19'' shows a burnt welding and the signaling devices 17'' and 18'' remain actuated until the button 27 is operated.

In the case of weak or burnt welding the energizing current for the coils 24'—24'' is cut out at 43 when the pedal is released. The opening of the contact 29 interrupts the circuit of the electromagnetic-valve and prevents all use of the machine before the actuation of button 27.

During this time the feeding circuit of the signaling devices is maintained closed by 44, which closed again when the pedal is released.

Operation of the cam mechanism (Group II)

When the pedal is depressed the contact 10 is closed. This contact causes current to flow, through the valve E (since the locked contacts 28 and 29 are closed in the position of rest).

Compressed air enters the cylinder P and the electrodes are brought nearer one to another and exert pressure onto the pieces to be welded.

When the small piston 11 serving as a pressure gauge indicates that the desired pressure is attained, the contact 9 closes.

At rest, contact 15' is closed and contact 9 when closing supplies the coil of the electromagnet 8' with current.

Coil 8' being supplied with current, contact 16 closes.

Contact 16 being closed, as well as contact 9 when contact 7' closes (under the control of cam 4') the electromagnet 8 is supplied with current.

At the same time contact 16' is closed, whereby when contact 7' closes, current flows through the welding machine.

Coil 8 being supplied with current, contact 13'' closes and when contact 7'' is closed, switch 15' is thrown out. No current flows through coil 8' and the main circuit of the welding machine is interrupted.

It is to be noted that the relays are provided with self-locking devices. For instance, if the electromagnet 8'' has been supplied with current, while the contact 9 of the pressure gauge remains closed, under the control of self-locking contact 15 the current continuously passes through coil 8 even if contact 7'' is interrupted. Therefore, only a single welding operation can be effected for each actuation of the electrodes P.

Operation of the wattmeters

The coils 20 (voltage) and 21 (current) cooperate in causing the disc of the wattmeter to rotate in one direction during the welding operation (the speed of rotation is a function of the currents which pass through the coils) and thus control the machine.

Operation of the switching and indicating devices

These devices are supplied with current through a strong direct current circuit which is fed by the rectifier 101. They operate when the pedal is released, that is to say when the pressure drops in the pressure gauge 11 and when contact 9 is interrupted (coil 8'', which is parallel with 8', becomes de-energized and contacts 31 and 39 close).

The contact 22 of the wattmeter G on the left hand side (which indicates good weldings and too strong weldings) supplies the coil of the electromagnet 24 with current.

The contact 22' of the wattmeter G' on the right hand side (which indicates only too strong weldings) supplies the coil 24'' with current. For too weak weldings none of the wattmeters is actuated and the contacts 22 and 22' remain open.

The relay I is the self-locking relay for too weak weldings.

The relay I¹ is the relay for correct weldings (it represents the closure of contact 22 of the wattmeter G and not to the closure of contact 22' of the wattmeter G''). It has no self-locking device.

The relay I² is the self-locking relay for too weak weldings (which represents the simultaneous closure of the wattmeters 22 and 22').

In all these devices the positions on the left hand side is the position of rest (electromagnet without current) and the tilting to the right hand side is the operative position (electromagnet being energized).

The metering and indicating devices H1 indicate normal weldings.

The metering and indicating devices H2 indicate excessive weldings.

If a welding is too weak the electromagnets 24' and 24'' are not energized. The contact of rest 31 and the contact 36 are closed. The electromagnet 24 being energized and locked, the contact 26 is closed. The current will pass through the indicators H for too weak weldings (17, 18, 19) as soon as the pedal is released.

If a welding is good, only the electromagnet 24' is energized. The switch 41 is closed by the contact 37 and the indicators H for correct welding (18' and 19') will be supplied with current as soon as the pedal is released.

If a welding is too strong, then the electromagnets 24' and 24" are energized. The contacts 42 and 33 are closed and the indicators H2 for too strong weldings will be supplied with current as soon as the pedal is released.

Embodiment according to Figure 6

In the embodiment according to Figure 6 a derivation from the main supply line 1 feeds the primary winding 52 of a transformer the secondary winding of which is divided in two sections 53'—53". The first of the said sections feeds the heating circuit of the cathode 54' of an electronic valve 54 comprising a grid. The other is inserted in a circuit comprising a condenser 55 and a resistance 56 with a movable tap connected with the grid 54" of the said valve. The biasing voltage of the said grid has the same frequency as the feeding current, but the phase is shifted.

The anode 54'" of the valve is connected with a conductor of line 1 through the switch 60 actuated by the starting pedal of the machine. It is also connected with the movable part 57' of a relay the coil 57 of which is connected with one of the conductors of the main line and through 57' with the anode circuit of the valve while the winding 57 is not energized.

The member 57' carries with it two similar members 58 and 59. The first of these members is inserted in a circuit which is controlled by the switch 60 and connected with a terminal of the winding 57. The member 58 closes its circuit only when 57' releases. The member 59 is inserted in a derivation of the main line, which derivation 61 passes through the coils 62 and 63 of the main relay of the welding machine, said coils being mounted in parallel with one another. It closes said derivation only when 57' releases.

The main relay of the welding machine has two movable contact members 62' and 63'. The first one opens the circuit of 63 when 62 is energized. The second one closes, when 63 is energized, the circuit 64 which supplies current to the primary winding 52 of the transformer of the welding machine. The movement of the member 62' is slowed down and the interruption takes place only after a controllable delay which is sufficient for the operation of the member 63'.

Owing to the provision of valve 54, the device always operates at the same point of a half-cycle of the current for the welding machine as shown in Figure 7.

In this figure the sinusoidal curve S represents the feeding current for the welding machine and the sinusoidal curve S' represents the alternating potential of the grid of the ionic valve. Owing to the alternating character and to the phase shifting of said potential with respect to the feeding current, the cathode-anode current of the valve passes only during the fraction $te$ of the positive half-cycles of the feeding current. The phase shifting of S' with respect to S is so selected that the value of the anode current of the valve is just equal, at $t$, to the value which is necessary for operating the relay 57—57'.

Therefore, when the operator actuates the starting device of the machine and closes the switch 60, the electromagnet 57 is energized only for the point $t$ of the half-cycle of the main current. The member 57' operating upon the opening at this moment closes the members 58 and 59 mechanically connected therewith. The member 58 maintains the coil 57 energized and the member 59 closes the circuit of coil 62. The member 62' releases with a characteristic delay of said member while the member 63' establishes the circuit of the welding machine at the desired point of the half-cycle and interrupts it after the time fixed by the main relay.

Embodiment according to Figure 8

This form of execution is characterized in that the closure of the main contactor of the welding machine is dependent on a relay which is continuously supplied with current while the machine is inactive through the starting pedal, and which is associated with a contact controlled by the synchronous motor so that the relay maintains its coil energized if the contact is closed when the pedal is depressed. The coil of the contactor will be energized only when the said contact is first opened and then closed.

In Figure 8, $a1$ is the primary winding with multiple taps of the welding machine, $a2$ being the secondary winding of said transformer which feeds the contact electrodes. The primary winding $a1$ is supplied with current under the control of the main contactor $b$ and of the switch $c$. One of the terminals of said primary winding is connected with a brush $d1$ which makes contact with the edge of a disc $d$ which is partly conductive and is rotated by a synchronous motor 100. On the same edge surface rests another brush $d2$ which is connected with the movable armature $e1$ of a relay the coil of which is designated by $e$.

When the coil $e$ is energized its contact $e1$ moves against $e2$ which is connected with one terminal of the coil $e$. When said coil is not energized, $e1$ comes into contact with $e3$, which is connected with the control coil $b1$ of the main contactor, coil $b1$ being connected with a return line.

The starting pedal $f$ for the welding machine is connected with one of the feeding conductors. At rest it contacts with $f1$ which is connected with coil $e$. When this pedal is depressed it comes against $f2$ which is connected with the coil $g$ of an auxiliary relay having two armatures which are rigidly connected with one another. Armature $g1$ is connected with a terminal of the coil $g$. It cooperates with $g2$ which is connected with a return line. The other armature $g3$ cooperates with $g4$, which is connected with coil $e$.

The coil $g$ and the armature $g3$ are connected with $h1$ and $h2$, respectively, which cooperate with the movable contacts $h3$, $h4$ rigidly connected with the main contactor $b$. The contact $h2$—$h4$ is closed when the contactor $b$ is open, and the contact $h1$—$h3$ is closed when the contactor $b$ is closed.

Operation

When the pedal $f$ is depressed, the circuit normally feeding the coil $e$ is interrupted at $f1$. Two cases are then possible depending whether or not the brushes $d1$ and $d2$ are connected together at this moment by a conducting portion of disc $d$.

If the brushes are not connected together, the relay $e$ being no longer energized, its movable contact $e1$ is at $e3$. As soon as the brushes $d1$ and $d2$ are interconnected, the main contactor $b$ will close and remain closed so long as this connection lasts.

If the brushes $d1$ and $d2$ are interconnected through a conducting portion of disc $d$ when the pedal is depressed, coil $e$ remains energized and maintains the circuit of the coil $b1$ of the contactor open until said connection is opened. At this moment the movable contact e1 comes against e2 and as soon as the brushes d1 and d2 are again connected, the current passes through b1 and the main contactor closes and remains closed so long as the brushes d1 and d2 are connected through d.

In both cases the contactor b closes at the same point of a half-cycle and remains closed for the same time, this time depending on the angular distance between the brushes d1, d2.

When closing, the contactor b interrupts the contact between h2 and h4 and at the same time closes the contact between h1 and h3. The coil g is then fed through h1, h3, f2 and f and the contact is established between g1, g2 and g3, g4. From this moment the coil g is again supplied with current through g1, g2. This coil remains, therefore, energized when the contactor b opens at the end of the welding operation and when the contact is broken between h1 and h3. The contactor b, when opening, re-establishes the contact between h2 and h4. e is, therefore, also supplied with current and the circuit of the coil b1 of the contactor b is interrupted at e3. The coil can be no longer re-energized while the pedal is depressed. When the pedal is released the circuit continuously feeding e is re-established at f1. At the same time the circuit of g is broken at f2 and causes the contacts to open at g2 and g4. Thus the device is again in the position of rest.

Adjusting of the time of welding

The time of closure of the contactor b and, consequently, the time during which the welding current flows, may be varied by making the brush d2 (Figures 9 and 10) movable. When the brushes are side by side (Figure 10) the closing time of b is a maximum, while it is naught when the angular spacing of the brushes corresponds (Figure 9) to the angle occupied by the conducting part on the disc d. By making the contact d1 also movable, the point of the half-cycle may be selected where the welding current begins to flow.

Embodiment according to Figure 11

In the embodiment according to Figure 11 the disc d cooperates with the contactor b for controlling the passage of the current in the welding machine. The purpose of this is to diminish the absolute error of time in the passage of the current by closing the primary circuit of the welding machine through a contact sliding on d, while avoiding any deterioration of said contact at the breaking point by effecting the breaking through the contactor.

The primary circuit is led through the mass of disc d, a brush i and the main contactor b. Another brush d3 rests on disc d. It is shifted at a certain angle with respect to i in the direction opposite to the rotation of the disc d. This angle is a function of the time constant of the contactor. The brush d3 is connected with the fixed contacts e2, e3 of a relay corresponding to the relays e—e1 of the unit shown in Figure 8. In this case both movable contacts e1, e'1 are connected, one with the coil e, and the other with the coil b' of the main contactor. When the welding machine is at rest, the relay e is supplied with current without interruption, its circuit closing through f1 and the pedal f, e, e1 is then in contact with e3, while the contact is broken between e'1 and e3. When the pedal is depressed the permanent feeding circuit of the relay e is broken.

Two cases are then possible.

(1) The brush d3 is at this moment on a non-conducting part of disc d. Coil e is then no longer energized, the contact is broken between e1 and e2 and established between e'1 and e3. Consequently, as soon as the conducting part of d engages the brush d3, coil b1 is energized and the contactor closes. However, the circuit of the welding machine is closed only when the conducting part of the disc d engages the brush i.

For breaking, the non-conducting part of disc d engages first the brush d3. The energizing circuit of b' is broken and the contactor opens before the insulating part of disc d engages the brush i. Thus the current is already interrupted when the sliding contact opens.

(2) If, at the moment of the depression of the pedal, the brush d3 is in contact with a conducting part of d, the relay e remains energized through e1, e2, d3, d. Thus the circuit of b remains broken until d3 is engaged by the non-conducting part of d and so long as it is not engaged by its conducting part. Then the device operates as in the foregoing case.

Construction of the wattmeter

The invention covers the foregoing welding machine units irrespective of construction of the ballistic wattmeter. One construction is shown by way of example in Figure 12.

The current winding 103 of this wattmeter is wound about a ring shaped magnetic core 103'. split at 65. The slotted part of ring core 103'. projects through a window in the insulating plate 66.

The voltage circuit of the wattmeter comprises a metallic band 67 arranged edgewise in the air gap and forming a half-turn. The ends of said band are wound so that they lie flat in front of the small connecting plates 68 which are mounted on 66. They are connected with said small plates by spring blades. The electrical connection is through small plaited cables 69. Another circuit 70 of the moving coil unit is made in the same manner as the voltage circuit 67. It compensates for the fall of voltage in the electrodes. Figure 13 shows the connections of said circuit in series with a rheostat 70'. One end of the same is connected with the corresponding end of the circuit 67 and the other is connected with a small connection plate 68' which is similar to 68.

The above described moving coil unit engages, at rest, screws such as 71 each extending through a transverse-piece such as 72 fixed on 66. It is provided on each side with an arm 73 which operates by means of an insulating finger 74 a scale contact such as 75. The contacts 75 are so arranged that only one or both are closed depending on the amplitude of the elongation of the moving coil unit. They act in the same manner as the contacts 22—22' in the embodiment according to Figure 3.

I claim:

1. In an electric spot welding machine: a synchronous motor, a cam shaft with three cams driven by this motor, three control relays for controlling the welding circuit: a first relay for preparing the welding circuit, a second relay for releasing the welding operation and a third relay for restoring the initial condition of the circuit, a contact in each of the relays controlled by the corresponding cam respectively.

2. In an electric spot welding machine: a synchronous motor, a cam shaft with three cams driven by this motor; three relays for controlling the welding circuit: a first relay for preparing the welding circuit, a second relay for releasing the welding operation, and a third relay for restoring the initial condition of the circuit, a contact in each of the relays controlled by the corresponding cam respectively, an electrovalve delivering the pressure for the application of the electrodes onto the sheets to be welded, and electrical control means inserted between the electrovalve and the foregoing relays.

3. In an electric spot welding machine, the combination of a synchronous motor, a shaft actuated by said motor, three cams carried by said shaft, three relays for controlling the welding circuit, said relays comprising a first relay for preparing the welding circuit, a second relay for discontinuing the welding and a third relay to restore the circuit to its initial condition, a contact carried by each of said relays and controlled by one of said cams, and contact means interposed between each relay and the adjacent relay, said means being controlled by the first relay and controlling the adjacent relay.

DAVID SCIAKY.